United States Patent [19]

Nasyrov et al.

[11] 4,117,077

[45] Sep. 26, 1978

[54] PROCESS FOR ALUNITE TREATMENT

[76] Inventors: Gakif Zakirovich Nasyrov, prospekt Nauki, 12, kv. 49; Evgenia Ivanovna Zemlyanskaya, Gavanskaya ulitsa, 10, kv. 25; Izabella Vladislavovna Ravdonikas, ulitsa III Internatsionala, 14, kv. 58, all of Leningrad, U.S.S.R.

[21] Appl. No.: 854,215

[22] Filed: Nov. 23, 1977

Related U.S. Application Data

[63] Continuation of Ser. No. 722,702, Sep. 13, 1976, abandoned.

[51] Int. Cl.$^2$ .............................................. C01F 7/06
[52] U.S. Cl. ................................... 423/127; 423/131; 423/182; 423/199; 423/208; 423/629
[58] Field of Search ................. 423/120, 127, 131, 629

[56] References Cited

U.S. PATENT DOCUMENTS

| 3,890,425 | 6/1975 | Stevens et al. | 423/120 |
| 3,984,521 | 10/1976 | Nasyrov et al. | 423/131 |
| 3,996,333 | 12/1976 | Rooke et al. | 423/127 |
| 4,029,737 | 6/1977 | Stevens et al. | 423/131 |

FOREIGN PATENT DOCUMENTS

| 2,345,292 | 7/1974 | Fed. Rep. of Germany | 423/120 |
| 2,360,112 | 6/1975 | Fed. Rep. of Germany | 423/120 |

*Primary Examiner*—Herbert T. Carter
*Attorney, Agent, or Firm*—Lackenbach, Lilling & Siegel

[57] ABSTRACT

A process for alunite ore treatment which comprises roasting alunite in the presence of oxygen at a temperature of from 580° to 620° C. for 1 to 3 hours, decomposing the roasted alunite by exposure to reducing agents at a temperature of from 580° to 620° C., subjecting the reduced alunite to hydrochemical treatment by use of a sodium hydroxide solution of concentration from 100 to 150 g/lit in terms of $Na_2O$, decomposing the resultant aluminate liquor, with the aluminum hydroxide component precipitating out, and finally, washing and baking the aluminum hydroxide precipitate to obtain same as an end product. The invention provides a comprehensive method of treatment of alunite ores the associated rock whereof comprises silica in the form of opal and chalcedony earlier believed to be refractory to comprehensive treatment by alkaline methods.

7 Claims, No Drawings

PROCESS FOR ALUNITE TREATMENT

This is a continuation of application Ser. No. 722,702 filed Sept. 13, 1976, now abandoned.

The present invention relates to inorganic chemistry and, more particularly, to the treatment of alunite ores by alkaline methods. Comprehensive alkaline treatment of alunite ores produces alumina, sulphuric acid, potassium sulphate and, as a concomitant benefit, rare elements: viz. vanadium pentoxide and gallium.

The proposed process is preferably applied to alunite ores the associated rock whereof contains silica in the form of non-crystalline modifications (opal and chalcedony). When such ores are treated by conventional alkaline techniques, the silica actively reacts with the aluminate liquor, resulting in the emergence of a lot of alkaline aluminosilicate compounds insoluble in the aluminate liquor and thus lost with the slurry.

There exists a known alkaline (reduction process for alunite treatment, whereby comminuted alunite ore is subjected to roasting in the presence of oxygen in a fluid bed at a temperature of from 520° to 540° C. remove the water of crystallization from the alunite. The roasted alunite is further subjected to thermal decomposition in a fluid bed at a temperature of from 540° to 560° C. by exposure to reducing agents (sulphur, solar oil, kerosene, converted gas or generator gas), the reaction proceeding by the following route:

$$R_2SO_4 \cdot Al_2(SO_4)_3 \cdot 2Al_2O_3 + 0.5C_2H_4 \rightarrow R_2SO_4 + 3Al_2O_3 \, 3SO_2 + CO_2 + H_2O,$$

where R is K or Na.

The waste sulphur dioxide is converted to sulphuric acid.

The reduced alunite ore is leached with a caustic alkali solution having a concentration of 110 to 120 g/lit in terms of $Na_2O$ at a temperature of from 85° to 95° C., aluminum oxide and a mixture of potassium and sodium sulphates precipitating out into the solution.

The resultant aluminum liquor is freed from silica and subjected to control filtration, after which it undergoes hydrolytic decomposition in the presence of an aluminum hydroxide seed by continuous agitation and cooling of the liquor to 45° or 50° C., causing precipitation of the aluminum oxide extracted into the aluminate liquor from the reduced alunite in the course of leaching. The clarified mother liquor is freed from the aluminum hydroxide crystals and concentrated by evaporation to a caustic alkali concentration in the product liquor of up to 250 or 260 g/lit in terms of $Na_2O$, causing precipitation of the mixture of the potassium and sodium sulphates extracted into the aluminate liquor from the reduced alunite in the course of leaching. The concentrated liquor is freed from the sulphates, diluted with the wash water produced while washing the alunite slurry and the product aluminum hydroxide, and recycled for leaching fresh batches of reduced alunite.

The mixture of potassium and sodium sulphates produced in the concentration of the recycle aluminate liquor is converted to commercial potassium sulphate with the aid of potassium hydroxide by the following route:

$$(Na_nK_m)_2SO_4 + nKOH \rightarrow K_2SO_4 + nNaOH,$$

where $n + m = 1$.

The sodium hydroxide liquor obtained in the aftermath of the conversion is employed to make up for the losses of the caustic alkali in the alumina production processes.

The chief disadvantages of the prior art process stem from the fact that the silicon oxides contained by the ore in the form of opal and chalcedony retain their crystalline structure in spite of the roasting and thermal decomposition of the alunite ore by exposure to reducing agents at a temperature in the range from 520° to 560° C. So, these silica forms actively react with the aluminate liquor in the course of leaching of the reduced alunite, causing extensive chemical losses of the alumina and alkali with the slurry due to the emergence of insoluble alkaline aluminosilicate compounds. Furthermore, the silicon oxides present in the ore as opal and chalcedony form a barrier to the reducing agents, with the result that traditional heat treatment of the alunite fails to achieve a desired degree of alunite decomposition by the action of the reducing agents.

It is an object of the present invention to obviate the above-mentioned disadvantages by way of neutralizing the reaction of the active silicon oxides represented in the associated rock of alunite ores by opal and chalcedony with the aluminate liquor, thereby preventing secondary chemical losses of the alunina and alkali with the waste slurry.

The foregoing object is attained by that in the proposed process, in accordance with the invention, the treatment of alunite ore includes the steps of roasting of the alunite at a temperature of from 580° to 620° C. for 1 to 3 hours in the presence of oxygen, thermal decomposition of the roasted alunite at a temperature of from 580° to 620° C. by exposure to reducing agents, leaching of the reduced alunite by treating same with a solution of caustic alkali of concentration from 100 to 150 g/lit in terms of $Na_2O$, hydrolytic decomposition of the resultant aluminate liquor, with the aluminium hydroxide precipitating out, and finally, washing and baking of the aluminum hydroxide precipitate to produce same as an end product.

In the course of heat treatment of alunite ores at temperatures in the above ranges, the silicon oxides present in the ore in the form of opal and chalcedony undergo changes in crystalline structure, giving free access for the reducing agents to the alunite mineral in the course of thermal decomposition and allowing neutralization of the reaction the silicon oxides with the aluminate liquor in the course of leaching of the reduced alunite.

The roasting and thermal decomposition of the roasted alunite by exposure to reducing agents are desirably effected at a temperature of 600° C. which conduces to the highest degree of alunite decomposition and a maximum recovery of alumina from the reduced alunite by leaching. Higher temperatures of the alunite ore heat treatment promote the formation of a large crystalline modification of aluminum oxide, reducing the yield of alunina from the reduced alunite by leaching. On the other hand, at temperatures below the above range, the process of silicon oxide crystallization fails to run its full course, hampering the thermal decomposition of the roasted alunite by exposure of reducing agents and leading to chemical losses of the alkali and alumina with the slurry due to the reaction of the silicon oxides with the aluminate liquor in the course of leaching the reduced alunite.

The leaching of the reduced alunite is preferably effected at a temperature in the range from 45° to 60° C. At higher temperatures, the silicon oxides react with the aluminate liquor during the course of leaching, resulting in chemical losses of the alumina and alkali with the slurry.

On the other hand, a liquor temperature below 45° C. while leaching the reduced alunite slows down the rate of dissolution of the aluminum oxide; furthermore, such temperatures are disadvantageous in a closed process from the viewpoint of heat engineering.

The proposed process for the treatment of alunite ores is realized as follows.

Comminuted alunite ore is roasted in a fluid bed by exposure to reducing agents selected from the group consisting of liquid or gaseous sulphur, generator gas, solar oil, kerosene and converted natural gas, the roasting procedure being effected at a temperature of from 580° to 620° C. for 40 to 60 minutes.

The roasting and reduction of alunite ore are preferably carried out at a temperature of 600° C. Higher temperatures are likely to give rise to insoluble forms of aluminum oxide in the reduced alunite. The waste sulphur dioxide of the alunite reduction process is utilized to produce sulphuric acid. The reduced alunite is leached with the recycle caustic alkali solution in concentrations from 100 to 150 g/lit in terms of $Na_2O$ at a temperature of from 45° to 60° C.

If the reduced alunite wherein silicon oxides are present in the form of opal and chalcedony is leached at a temperature above the mentioned range, the silicon oxides will react with the aluminate liquor, resulting in secondary chemical losses of the alumina and alkali. The aluminum oxide and a mixture of potassium and sodium sulphates are extracted from the reduced alunite into the solution. The solid leaching residue is dumped. The resultant aluminate liquor is concentrated by evaporation to a caustic alkali concentration in the evaporated liquor of from 200 to 220 g/lit in terms of $Na_2O$, the mixture of potassium and sodium sulphates extracted into the aluminate liquor from the reduced alunite and in the course of leaching precipitating out. Further, the sulphate mixture is converted to commercial potassium sulphate by use of a potassium hydroxide solution in a manner as shown while describing the prior art process hereabove. The concentrated aluminate liquor now free of the sulphates is diluted to a concentration of the caustic alkali of from 120 to 150 g/lit in terms of $Na_2O$ with the wash water obtained while washing the alunite slurry, and further subjected to hydrolytic decomposition in the presence of an aluminum hydroxide seed by continuous agitation and cooling of the liquor to a temperature between 45° to 50° C., the aluminum hydroxide extracted into the aluminate liquor from the reduced alunite in the course of leaching precipitating out. The aluminum hydroxide is subjected to filtration and washing after which it is baked at a temperature of from 1,200° to 1,250° C. to give an end product which is transported to the commercial storehouse.

The clarified mother liquor freed from the aluminum hydroxide crystals is recycled for leaching fresh batches of reduced alunite.

The process of this invention allows comprehensive treatment of alunite ores whereof the associated rock contains silica in the form of opal and chalcedony, whereas earlier alunite ores containing active silicon oxides were regarded as refractory to comprehensive treatment by alkaline methods.

Besides, the proposed process as applied to the above kinds of alunite ore conduces to a higher degree of decomposition of aluminium sulphate while reducing alunite. The efficiency of the proposed process used for comprehensive treatment of alunite ores containing active silica is illustrated in Table 1.

Table 1

| Roasting Conditions | | Reduction Conditions | | Reduced product | |
|---|---|---|---|---|---|
| | | | | Recovery | Degree of aluminium sulphate |
| Temperature, °C | Time, min. | Temperature, °C | Time, min. | ratio in leaching % | decomposition, % |
| 520 | 60 | 580 | 60 | 42 | 60.0 |
| 540 | 60 | 580 | 60 | 84 | 64 |
| 560 | 60 | 580 | 60 | 90 | 73 |
| 580 | 60 | 580 | 60 | 92.5 | 83.5 |
| 600 | 60 | 580 | 60 | 94.5 | 87.5 |
| 600 | 50 | 600 | 60 | 93.5 | 93 |
| 620 | 50 | 600 | 60 | 85 | 94 |

The invention will be further understood from the following exemplary embodiments thereof.

EXAMPLE 1

1,000 g of comminuted alunite ore containing 272 g of $Al_2O_3$, 283 g of $SO_3$, 56 g of alkalies in terms of $Na_2O$ and 210 g of silicon oxides in the form of opal and chalcedony were roasted in the presence of oxygen at a temperature of 500° C. for 1.5 hr and then subjected to thermal decomposition at a temperature of 580° C. by exposure to sulphur vapour supplied into the reaction vessel at a temperature of from 350° to 400° C. to yield 710 g of reduced alunite containing 272 g of $Al_2O_3$, 95 g of $SO_3$, 56 g of alkaline in terms of $Na_2O$ and 210 g of silicon oxides with a modified crystalline structure.

The reduced alunite thus produced was leached with 2 lit of a solution containing 150 g/lit of a caustic alkali in terms of $Na_2O$ at a temperature of 50° C. for one hour, extracting into the solution 250 g of $Al_2O_3$, 91 g of $SO_3$ and 49 g of $Na_2O$, which corresponds to 91.5 percent recovery of alumina and 87.0 percent recovery of alkalis.

EXAMPLE 2

1,000 g of alunite ore containing 272 g of $Al_2O_3$, 285 g of $SO_3$ and 56 g of a silicon oxide in the form of opal and chalcedony was roasted at a temperature of 620° C. for one hour and then subjected to thermal decomposition at a temperature of 600° C. by exposure to sulphur vapour supplied into the reaction vessel at a temperature of from 350° to 400° C. to yield 700 g of reduced alunite containing 272 g of $Al_2O_3$, 85 g of $SO_3$ and 56 g of alkalies in terms of $Na_2O$. The degree of alunite decomposition amounted to 94 percent.

The reduced alunite was leached with 2 lit of a solution containing 150 g/lit of caustic alkali in terms of $Na_2O$ at a temperature of 50° C. for one hour, extracting into the solution 235 g of $Al_2O_3$, 82 g of $SO_3$ and 50 g of $Na_2O$, which corresponds to 86.5 percent recovery of alumina and 89.5 percent recovery of alkalis.

EXAMPLE 3

1,000 g of comminuted alunite ore containing 272 g of $Al_2O_3$, 285 g of $SO_3$ and 56 g of alkalies in terms of $Na_2O$ was roasted at a temperature of 580° C. for 1.5 hr; the roasted alunite was subjected to thermal decomposition at a temperature of 580° C. by exposure to sulphur vapor supplied into the reaction vessal at a temperature of from 350° to 400° C. The heat treatment yielded 722 g of reduced alunite containing 272 g $Al_2O_3$, 106 g of $SO_3$ and 56 g of alkalies in terms of $Na_2O$, corresponding to 84 percent decomposition of the alunite.

The reduced alunite was leached with 2 lit of a solution containing 150 g/lit of caustic alkali in terms of $Na_2O$ at a temperature of 50° C. for 1 hour, extracting into the solution 245 g of $Al_2O_3$, 100 g of $SO_3$ and 48 g of $Na_2O$, which corresponds to 90 percent alumina recovery and 86 percent alkali recovery.

EXAMPLE 4

1,000 g of comminuted alunite ore containing 272 g of $Al_2O_3$, 285 g of $SO_3$ and 56 g of alkalies in terms of $Na_2O$ was roasted at a temperature of 600° C. for 1.5 hr and then subjected to thermal decomposition at a temperature of 580° C. by exposure to sulphur vapour supplied into the reaction vessel at a temperature of from 350° to 400° C. The heat treatment yielded 710 g of reduced alunite containing 272 g of $Al_2O_3$, 95 g of $SO_3$, 56 g of alkalies in terms of $Na_2O$ and 210 g of silicon oxides with a modified crystalline structure.

The reduced alunite thus produced was leached with 2 lit of a solution containing 150 g/lit of caustic alkali in terms of $Na_2O$ at a temperature of 85° C. for one hour, extracting into the solution 230 g of $Al_2O_3$, 90 g of $SO_3$ and 40 g of $Na_2O$, which corresponds to 85 percent recovery of alumina and 70.5 percent recovery of alkalis.

EXAMPLE 5

1,000 g of comminuted alunite ore containing 272 g of $Al_2O_3$, 285 g of $SO_3$ and 56 of alkalies in terms of $Na_2O$ was roasted at a temperature of 600° C. for 1.5 hr and then subjected to thermal decomposition at a temperature of 600° C. by exposure to kerosene vapour supplied into the reaction vessel at a temperature of 500° C. The heat treatment yielded 700 g of reduced alunite containing 272 g of $Al_2O_3$, 84 g of $SO_3$ and 56 g of alkalies in terms of $Na_2O$. The degree of decomposition of the aluminum sulphate of the alunite was 95 percent.

The reduced alunite was leached with 2 lit of a solution containing 150 g/lit in terms $Na_2O$ at a temperature of 50° C. for one hour, extracting into the solution 230 g of $Al_2O_3$, 80 g of $SO_3$ and 48 g of $Na_2O$, which corresponds to 85 percent recovery of alumina and 87 percent recovery of alkalis.

What is claimed is:

1. A process for the treatment of alunite ore containing silicon oxides in the form of opal and chalcedony which comprises:
   (a) roasting said alunite ore in the presence of oxygen at a temperature of from 580° to 620° C. for 1 to 3 hours;
   (b) decomposing the roasted alunite ore in the presence of a reducing agent at a temperature of from 580° to 620° C. for 40 to 60 minutes, to form a reduced alunite ore;
   (c) leaching the reduced alunite ore at a temperature of from 45° to 85° C. by treatment with a solution of sodium hydroxide having a concentration of 100 to 150 grams per liter in terms of $Na_2O$, to extract aluminum oxide and a mixture of potassium and sodium sulfates into solution, and to form a residue which is separated from said solution;
   (d) evaporating said solution to concentrate the sodium hydroxide to 200 to 220 grams per liter in terms of $Na_2O$, thereby precipitating the potassium and sodium sulfates, and separating said mixed surface precipitate;
   (e) diluting the aluminum oxide solution to a sodium hydroxide concentration of from 120 to 150 grams per liter in terms of $Na_2O$;
   (f) precipitating aluminum hydroxide from the aluminum oxide solution by seeding said solution under agitation with aluminum hydroxide; and
   (g) separating the aluminum hydroxide.

2. The process of claim 1, wherein the roasting step (a) is conducted at a temperature of about 600° C.

3. The process of claim 1, wherein the decomposition step (B) is conducted at a temperature of about 600° C.

4. The process of claim 1, wherein the leaching step (c) utilizes recycled sodium hydroxide solution.

5. The process of claim 1, wherein the precipitating step (f) is conducted at a temperature of 45° to 50° C.

6. Process of claim 1 (c), wherein the said leaching occurs at a temperature of from 45° to 60° C.

7. The process of claim 1 (d), wherein said sulfates are converted to potassium sulfate by treatment with a potassium hydroxide solution.

* * * * *